United States Patent [19]
McGuigan et al.

[11] 3,882,044
[45] May 6, 1975

[54] ANTIOXIDANT COMPOSITION OF A REARRANGEMENT PRODUCT OF A TETRA-ARYL HYDRAZINE AND SULFUR OR A SULFURIZING AGENT

[75] Inventors: Brian McGuigan, Timperley; Richard John Dellar, Bolton; William David Phillips, Poynton, all of England

[73] Assignee: Ciba-Geigy Corporation, Ardsley, N.Y.

[22] Filed: Oct. 10, 1972

[21] Appl. No.: 296,453

[30] Foreign Application Priority Data
Oct. 16, 1971  United Kingdom............... 48238/71

[52] U.S. Cl. ............... 252/402; 252/405; 252/406; 260/45.7 S; 260/45.9 R; 260/243 A; 252/400 A; 252/400 R
[51] Int. Cl.............................................. B01j 1/16
[58] Field of Search.... 252/402, 406, 400 R, 400 A, 252/405; 260/243 A, 576, 569, 45.7 S, 260/45.9 R, 45.95 C

[56] References Cited
UNITED STATES PATENTS

| | | | |
|---|---|---|---|
| 3,458,509 | 7/1969 | Levine | 252/402 |
| 3,489,749 | 1/1970 | Randell | 252/405 |
| 3,523,910 | 8/1970 | Randell | 252/402 |
| 3,536,706 | 10/1970 | Randell | 252/402 |
| 3,761,520 | 9/1973 | Napolitano | 260/243 A |

FOREIGN PATENTS OR APPLICATIONS

| | | |
|---|---|---|
| 1,224,653 | 3/1971 | United Kingdom |

*Primary Examiner*—Benjamin R. Padgett
*Assistant Examiner*—Irwin Gluck
*Attorney, Agent, or Firm*—Nestor W. Shust

[57] ABSTRACT

Antioxidant compositions are prepared by thermally rearranging tetra-aryl hydrazines and then heating the rearrangement product with sulphur or sulphurising agents.

5 Claims, No Drawings

ANTIOXIDANT COMPOSITION OF A REARRANGEMENT PRODUCT OF A TETRA-ARYL HYDRAZINE AND SULFUR OR A SULFURIZING AGENT

The present invention relates to antioxidant compositions.

In British Patent Specification No. 1,224,653, tetraaryl hydrazines having the formula:

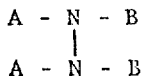

wherein A is an unsubstituted benzene or unsubstituted -α or β-linked-naphthalene nucleus or a phenyl nucleus substituted with one or more alkyl groups each containing from 4 to 9 carbon atoms and B is a phenyl group having one or more alkyl substituent groups each containing from 4 to 9 carbon atoms, are described. These compounds are prepared, for example by oxidation of a diarylamine A.NH.B. They are antioxidants, especially when incorporated into synthetic lubricants.

These tetra-aryl hydrazines may be converted by suitable processes into antioxidant compositions of even superior quality. Thus, in British Patent Specification No. 1,224,556, processes for producing antioxidant compositions which comprises oxidising at an elevated temperature, a compound having either the formula:

$$A - NH - B$$

or the formula

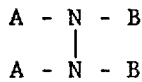

wherein A represents an unsubstituted phenyl α-naphthyl or β-naphthyl group, or a phenyl group having one or more tertiary alkyl group substituents containing from 4 to 9 carbon atoms or an α, α-dimethylbenzyl group are described. In this Specification is also described how the oxidation may advantageously be carried out in the presence of an alkali metal salt of a fatty acid or of an alkali metal salt of a phenol.

We have now discovered a further way in which excellent antioxidant compositions can be prepared.

According to the present invention there is provided a process for preparing an antioxidant composition which comprises thermally rearranging, by heating in a nonoxidising atmosphere, a compound of the formula:

in which A, B, C and D represent a phenyl group, a phenyl group substituted with one or more alkyl groups having 1 to 12 carbon atoms or with one or more aralkyl or 1-alkyl cycloalkyl groups, and then heating the rearrangement product with sulphur or with a sulphurising agent. Compounds of the formula I include hydrazines where A, B, C and D are all different or where two or more of A, B, C and D are the same, e.g. where A and C are phenyl and B and D are substituted phenyl or where A and C and B and D are differently substituted phenyl groups.

Certain of the starting materials of formula I for our process are described in British Patent Specification No. 1,224,653. Compounds in which the phenyl groups bear substituents which are alkyl groups containing from 10 to 12 carbon atoms can be prepared in a strictly analogous manner to that described; the compound in which the phenyl group substituent is methyl can be prepared by heating p-toluidine and its hydrochloride at 140° – 200°C. under pressure (Wieland, Berichte 40, 4271), and the ethyl analogue can be prepared in similar manner. To prepare the hydrazine in which the substituents are isopropyl groups, 4,4' diisopropyl diphenylamine is produced by isopropylation of diphenylamine under similar but rather more severe conditions than those used for the preparation of 4,4' di-t-butyl diphenylamine, and the diphenylamine then oxidised. 4,4' di (α,α dimethyl benzyl) diphenylamine is commercially available (for example under the trade name Naugard 445) and may be oxidised to form the corresponding tetra-substituted hydrazine.

Highly effective antioxidant compositions are obtained when each substituent A and B is a phenyl group bearing at least one alkyl group substituent, and that preferably a tertiary alkyl group substituent, most preferably containing from 4 to 9 carbon atoms.

Specific examples of alkyl substituents on A, B, C and/or D are the t-butyl, t-octyl, nonyl and dodecanyl groups; excellent results are obtained when each A and B is a t-octyl phenyl group. A specific example of an aralkyl substituent on A, B, C and/or D is the α,α-dimethyl benzyl group. Examples of 1-alkyl cycloalkyl groups are 1-methyl cyclopentyl and 1-methyl cyclohexyl.

Neither the rearrangement product nor the antioxidant composition produced according to this invention is a single pure compound. For example, one rearrangement product which can subsequently be sulphurised to form an excellent antioxidant composition may be prepared and analysed as follows:

100 parts of tetra (4-t-octylphenyl) hydrazine were stirred and heated at 180°C. under a flow of nitrogen. After 2 hours the reaction mass was cooled to give a glassy brown solid (to be known as Rearrangement Product A) which was shown by thin layer chromatography to be a mixture of products. Separation of the mass by column chromatography on alumina (grade U.G. 2) eluted with petroleum ether, b.p. 60° – 80°C. gave three fractions. Fraction 1 (30% by weight) consisted of three isomeric compounds having the formula:

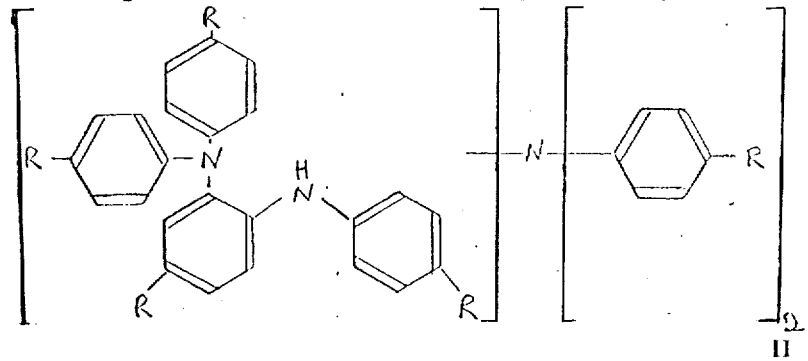

where R = t-octyl. This fraction, after two recrystallisations from 90% ethanol + 10% petroleum ether (60°–80°C.) yielded colourless crystals (26.3%), melting point 80°–105°C. having the following elemental analysis:

| Found | C,85.65% | H,10.4% | N,3.73% | mol.wt. 1182 |
|---|---|---|---|---|
| C₈₄H₁₂₅N₃ requires: | C,85.72% | H,10.70% | N,3.57% | mol.wt. 1176.9 |

Fraction 2 (60% by weight) after recrystallisation from 90% methanol + 10% diethyl ether yielded colourless crystals (51%) of 2-(4,4'-di-t-octyldiphenylamino)-4,4'-di-t-octyldiphenylamine.

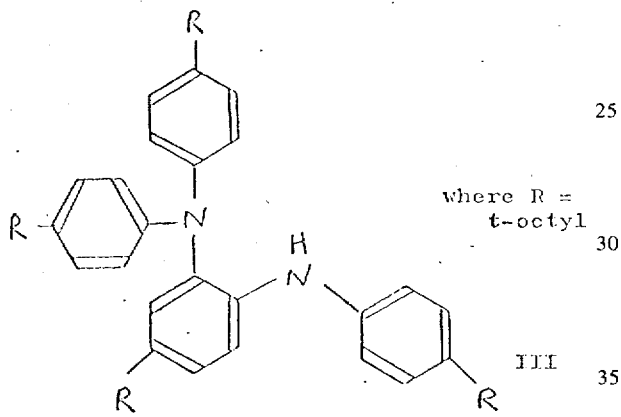

where R = t-octyl

III having a melting point of 113°–114°C. and the following elemental analysis:

| Found | C,85.49% | H,10.62% | N,3.63% | Mol.wt.784.6 |
|---|---|---|---|---|
| C₅₆H₈₄N₂ requires: | C,85.64% | H,10.78% | N,3.56% | Mol.wt.785.3 |

The excellent antioxidant compositions according to the invention can also be obtained by combining compounds of this formula III where R is as previously defined with sulphur or a sulphurising agent.

Fraction 3 (10%) was shown by infra-red spectroscopy and melting point to be 4,4'-di-t-octyldiphenylamine.

The thermal rearrangement may involve heating the hydrazine compound in an atmosphere of nitrogen for up to 48 hours. The temperature may be from 80° to 300°C. and temperatures of from 120° to 180°C. have been found to be very satisfactory.

Reaction of the rearrangement product with sulphur is suitably carried out at 100° to 300°C., preferably at 150° to 250°C. The quantity of sulphur used may be from 0.1 to 4 moles per mole (observed average molecular weight) of rearrangement product, but excesses can be used as desired to facilitate completion of reaction. The reaction is assumed completed when there is no evolution of hydrogen sulphide, with sulphur still present; this will generally be after a period of from 2 to 100 hours. In fact, however, there is no need to react to completion, but in that case substantial excess of sulphur should be avoided. The reaction may be carried out in the presence of iodine or other conventional catalyst, or solvent such as xylene.

Another valuable class of sulphurising agents which may be used are the sulphur halides, especially the chlorides. Reaction may then be carried out in a solvent, such as aluminium chloride, or hydrogen chloride acceptor such as triethylamine theory we believe that the antioxidant compositions of the present invention contain one or more of the following phenothiazine compounds:

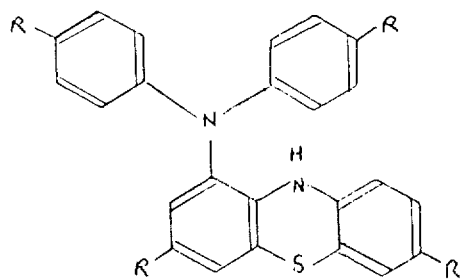

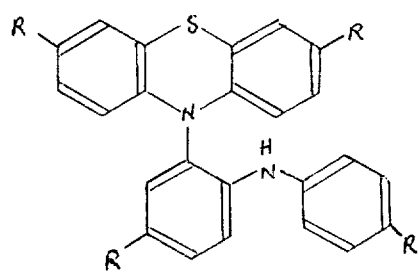

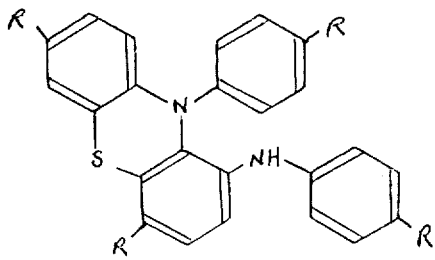

wherein R represents the substituent on the phenyl group of the hydrazine starting material. In addition di or tri-phenothiazine compounds may be present.

When a sulphur halide is used as sulphurising agent we believe that a small amount of halogen is incorporated into the product, possibly by halogenation of the nucleus.

The rearrangement product obtained contains the diphenylamine from which the hydrazine compound is derived. The diphenylamine may be allowed to remain in the product which is reacted with sulphur or a sulphurising agent, or it may be removed, e.g. by precipitation from a solution of the rearrangement product as its hydrochloride in the case of butyl substituted compounds or by chromatography in the case of octyl substituted compounds.

Examples of substrates which may be protected using antioxidants according to the invention are mineral oils, synthetic lubricants, rubber and plastics.

The antioxidants of the present invention may be used alone or in combination with other antioxidants, metal passivators, rust inhibitors, viscosity-index improvers, pour-point depressants, dispersants or detergents, extreme-pressure or anti-wear additives.

Examples of suitable other antioxidants which may be used in conjunction with the antioxidants of the present invention are compounds or mixtures of compounds selected from one or more of the following groups:
  i. alkylated and non-alkylated aromatic amines and mixtures thereof
  ii. hindered phenols
  iii. alakyl, aryl or alkaryl phosphites
  iv. esters of thiodipropionic acid
  v. salts of di-thio carbamic or dithiophosphoric acids Suitable amine compounds under sub-heading i are dioctyldiphenylamine, mono-t-octyl-α- and -β-naphthylamines, dioctyl-phenothiazine and phenyl-α- and β-naphthylamine; suitable hindered phenols under sub-heading ii are 2,6-di-tertiarybutyl-p-cresol, 4-4'-bis-(2,6-diisopropylphenol), 2,4,6-triisopropyl-phenol and 2,2'-thio-bis-(4-methyl-6-t-butylphenol); examples of phosphites under heading iii are triphenyl phosphite, trinonyl phosphite and diphenyldecylphosphite; a suitable ester of thiodipropionic acid is dilauryl thiodipropionate; examples of suitable salts under heading v are antimony diamyldithiocarbonate and zinc diamyldithiophosphate.

Examples of suitable metal passivators include those of the following types:
  a. for copper; for example, benzotriazole 5,5'-methylene-bisbenzotriazole, 4,5,6,7-tetrahydrobenzotriazole, 2,5-dimercaptothiadiazole, salicylidene-propylene-diamine, salts of salicylaminoguanidine.
  b. for magnesium; for example pyridylamines
  c. for lead; for example quinizarin, propyl gallate, sebacic acid etc.

Rust inhibitors which may be employed in the lubricant compositions include those of the following groups:
  a. Organic acids, for instance, sebacic acid and N-oleyl sarcosine and esters, metal salts and anhydrides of organic acids, for example, sorbitan mono-oleate, lead naphthenate and dodecenylsuccinic anhydride.
  b. Nitrogen containing materials, for example:
      i. primary, secondary or tertiary aliphatic or cycloaliphatic amines and amine salts of organic and inorganic acids, for example morpholine, stearyl amine and triethanolamine caprylate.
      ii. heterocyclic compounds, for example imidazolines, and oxazolines.
  c. Phosphorus containing materials, for example inorganic phosphates, phosphonic acids and amine phosphates.
  d. Sulphur containing materials, for example barium dinonylnaphthalene sulphonates.

Suitable viscosity index improvers or pour-point depressants are, for instance, polyacrylates, polybutenes, polyvinyl pyrrolidones and polyethers.

Examples of dispersants or detergents include metal sulphonates especially calcium, barium and magnesium salts, metal phenates and polybutenyl succinimides.

Extreme pressure or antiwear additives appropriate for use in the lubricant composition include sulphur and/or phosphorus and/or halogen containing materials, for instance sulphurised oleate esters, tritolyl phosphate and chlorinated paraffins.

Other organic materials susceptible to oxidative degradation and for which the antioxidant compositions of the present invention are valuable antioxidants include, for instance, substances falling within the following groups:
  a. materials consisting of, or based on, aliphatic or other hydrocarbons, for instance gasoline, lubricating oils, lubricating greases, mineral oils and waxes.
  b. natural and synthetic polymeric materials, for instance, natural rubber; synthetic addition polymers such as homopolymers and co-polymers of vinyl and vinylidene monomers including ethylene, propylene, styrene, butadiene, acrylonitrile, vinyl chloride, vinyl acetate; synthetic polymers derived from condensation reactions and containing ether ester, amide or urethane groupings, for instance polyester, polyamide, polyurethane, polyalkylene glycols and polyarylene ether resins.
  c. non-polymeric oxygen-containing substances for instance aldehydes such as n-heptaldehyde, and unsaturated fatty acids or ester thereof for instance ricinoleic acid and methyl oleate.
  d. organo-metalloid substances such as silicone polymers, for instance polydimethylsiloxanes, polymethylphenyl-siloxanes and chlorinated derivatives thereof, silanes for instance tetra-alkyl and tetra-aryl silanes; and organo-metallic substances such as organo-metallic polymers.
  e. vitamins, essential oils, ketones and ethers. The invention will be illustrated by reference to the following Examples, all parts and proportions being by weight, unless otherwise stated.

EXAMPLE 1

50 parts of rearrangement product A, containing 4,4'-di-t-octyldiphenylamine (5 parts), 2-(4,4'-di-t-octyldiphenylamine)-4,4'-di-t-octyldiphenylamine (30 parts), and three isomeric compounds (15 parts) of molecular formula $C_{84}H_{125}N_3$, 4.4 parts of sulphur, and a trace of iodine were stirred and heated at 220°C until evolution of hydrogen sulphide ceased (26 hours). Afterwards the product was taken up into toluene and washed with 20% sodium sulphide (2 × 100 ml.) 23% sodium hydroxide (2 × 100 ml.), and water (3 × 100 ml.), the toluene solution dried over anhydrous sodium sulphate and the solvent then removed by evaporation under vacuum at 100°C. The residue (46.4 parts) was a khaki-coloured solid which was shown by thin layer chromatography to be a mixture of products.

Elemental analysis of the product gave the following analytical data by weight:

C, 79.89%; H, 9.53%; N, 2.89%; S, 7.62%

EXAMPLE 2

In a similar experiment to that described in Example 1, 50 parts of rearrangement product A, 8.8 parts of sulphur, and a trace of iodine were stirred and heated at 220°C. The reaction mixture was then worked up in the manner described in Example 1. In this way a fine khaki-coloured powder, melting at 74°– 98°C., which was shown by thin layer chromatography to be a complex mixture of compounds, was obtained having excellent antioxidant properties and having the following elemental analysis by weight:

Found: C, 76.55%; H, 9.3%; N, 3.23%; S, 11.0%

EXAMPLE 3

100 parts of tetra (4-t-butylphenyl) hydrazine (prepared as described in Specification No. 1,224,653) were heated at 180°C. under a flow of nitrogen. After 24 hours the reaction mass was cooled to give a glassy brown solid, hereafter known as rearrangement Product B, which was shown by thin layer chromatography to be a mixture of 4,4'-di-t-butyl diphenylamine (20%), 2-(4,4'-di-t-butyl-diphenylamino)-4,4'-di-t-butyl diphenylamine, (aprox. 55%), and three isomeric compounds (25%) of molecular formula $C_{60}H_{78}N_3$.

In a similar experiment to that described in Example 1, 40 parts of rearrangement Product B, 9.68 parts of sulphur, and a trace of iodine were stirred and heated at 200°C. for 100 hours. The reaction mixture was then worked up in the manner described in Example 1 to give 41.7 parts of brown powder, which was shown by thin layer chromatography to be a mixture of compounds. Elemental analysis of the product gave the following analytical data by weight:

Found: C, 79.01%; H, 8,60; N, 3.99; S, 7.09%

EXAMPLE 4

To a diethyl ether (700 parts) solution of 89.5 parts of rearrangement product B, anhydrous hydrogen chloride was introduced with stirring for 15 minutes. The precipitate, 8.9 parts of 4,4'-di-t-butyl diphenylamine hydrochloride, was collected by filtration. The filtrate was washed with water (2 × 100 parts), the ether solution dried over anhydrous sodium sulphate and the solvent then removed by evaporation under vacuum. The residue (71.6 parts) was a brown solid, hereafter known as rearrangement product C, melting at 93°– 104°C., which was shown by thin layer chromatography to be a mixture of 2-(4,4'-di-t-butyl diphenylamino)-4,4'-di-t-butyl diphenylamine (70%) and three isomeric compounds of molecular formula $C_{60}H_{78}N_3$ (30%).

In a similar experiment to that described in Example 1, 20 parts of rearrangement product C, 2.1 parts of sulphur, and a trace of iodine were stirred and heated at 200°C. for 30 hours. The reaction mixture was then worked up in the manner described in Example 1 to give 18 parts of brown powder, melting point 134°– 155°C. The powder was shown by thin layer chromatography to be a mixture of compounds and having the following elemental analysis by weight:

Found: C, 79.92; H, 8.3; N, 4.28; S, 4.38%

EXAMPLE 5

20 parts of rearrangement product C, 4.2 parts of sulphur, and a trace of iodine were stirred and heated at 200°C. for 30 hours. The reaction mixture was then worked up in the manner described in Example 1 to give 16.5 parts of brown powder melting point 140°– 164°C. The powder was shown by thin layer chromatography to be a mixture of compounds and having the following analytical data by weight:

Found: C, 80.0; H, 8.24; N, 4.24; S, 4.26%

EXAMPLE 6

100 parts of rearrangement product D, prepared in an analogous manner to that used for rearrangement product A using tetra [4-($\alpha$, $\alpha$-dimethylbenzyl) phenyl] hydrazine instead of tetra (4-t-octyl phenyl) hydrazine; 7.9 parts of sulphur, and a trace of iodine were stirred and heated at 220°C. for 24 hours. The reaction mixture was then worked up in the manner described in Example 1 to give 101.1 parts of green-brown powder, melting point 40°– 60°C. The powder was shown by thin layer chromatography to be a mixture of compounds and having the following analytical data by weight:

Found: C, 86.38; H, 7.10; N, 3.22; S, 3.41%

EXAMPLE 7

40 parts rearrangement product B, 9.68 parts sulphur, 250 parts xylene and a trace of iodine were stirred and refluxed for 30 hours. The resulting solution was washed, dried and stripped in the manner described in Example 1. The product was shown by thin layer chromatography to be a mixture of compounds having the following elemental analysis by weight:

Found: C, 76.5; H, 8.28; N, 3.98; S, 9.57%

EXAMPLE 8

To an agitated mixture of 29 parts of rearrangement product A, 2 parts aluminium chloride and 50 parts 1,2-dichloroethane at room temperature were added 5.4 parts sulphur monochloride in 10 parts dichloroethane over a period of 10 minutes. The reaction mixture was heated then to reflux and maintained for 14 hours. Afterwards the reaction mass was cooled, washed with water and solvent then removed by evaporation under vacuum at 100°C. The residue was taken up in toluene (150 ml. ) and washed with hot 23% sodium hydroxide (2 × 50 ml.), water (3 × 100 ml.), and the solvent again removed by evaporation under vacuum at 100°C. The residue (29.2 parts) was a yellow coloured solid melting point 90°– 120°C. which was shown by thin layer chromatography to be a complex mixture of compounds. Elemental analysis of the product gave the following analytical data by weight:

Found: C, 78.0; H, 9.2; N, 3.0; S, 8.45%
Cl, 0.2%

EXAMPLE 9

In a similar experiment to that described in Example 8, to a mixture of 30 parts of rearrangement product A, 4.6 parts aluminium chloride, and 40 parts of 1,2-dichloroethane were added 3.5 parts of suplhur dichloride over a period of 1 hour. The reaction mixture was then worked up in the manner described in Example 8 to give a brown coloured solid which was shown by thin layer chromatography to be a mixture of products. Elemental analysis of the product gave the following analytical data by weight:

Found: C, 82.63; H, 9.91; N, 3.17; S, 2.95%
Cl, 0.0%

EXAMPLE 10

To a well stirred mixture of 100 parts of rearrangement product B, 22.75 parts aluminium chloride, and 250 parts by volume of 1,2-dichloroethane at room temperature were added 23 parts of sulphur monochloride in 100 parts by volume of 1,2-dichloroethane over a period of 1 hour. The reaction mixture was heated then to reflux and maintained for 16 hours. Afterwards the reaction mixture was worked-up in the manner described in Example 8 to give 111.8 parts of brown-coloured solid melting point 70° – 90°C. which was shown by thin layer chromatography to be a mixture of products.

Elemental analysis of the product gave the following analytical data by weight:

Found: C, 81.1; H, 8.7; N, 4.03; S, 5.59;
Cl, 0.0%

EXAMPLE 11

To an agitated mixture of 100 parts of Rearrangement product D, 16.6 parts aluminium chloride, and 250 parts by volume of 1,2-dichloroethane at room temperature were added 16.8 parts sulphur monochloride in 50 parts by volume of 1,2-dichloroethane over a period of 1 hour. The reaction mixture was heated then to reflux and maintained for 16 hours. Afterwards the reaction mass was worked up in the manner described in Example 8 to give 108.1 parts of green-brown coloured solid, melting point 30°– 60°C. which was shown by thin layer chromatography to be a mixture of products.

Elemental analysis of the product gave the following analytical data by weight:

Found: C, 84.85; H, 7.07; N, 3.07; S, 4.63;
Cl, 0.32%

EXAMPLE 12

In a similar experiment to that described in Example 11, to a mixture of 100 parts of Rearrangement product D, 16.6 parts aluminium chloride, and 250 parts by volume of 1,2-dichloroethane was added a mixture containing 12.8 parts of sulphur dichloride in 50 parts by volume of 1,2-dichloroethane over a period of 1 hour. The reaction mass was then heated to reflux and maintained for 16 hours. Afterwards the reaction mass was worked up in the manner described in Example 11 to give 104.3 parts of green coloured solid which was shown by thin layer chromatography to be a mixture of products. Elemental analysis of the product gave the following analytical data by weight:

Found: C, 85.96; H, 7.25; N, 3.16; S, 3.23;
Cl, 0.40%

EXAMPLE 13

To an agitated mixture of 44.2 parts of Rearrangement product A, 5.55 parts triethylamine, and 100 parts by volume of benzene at room temperature was added a solution of 3.4 parts of sulphur monochloride in 40 parts by volume of benzene over a period of 1 hour. The reaction mixture was then stirred at room temperature for 20 hours, filtered to remove 7.7 parts of triethylamine hydrochloride, and solvent removed under vacuum to give 44.8 parts of brown coloured solid which was shown by thin layer chromatography to be a mixture of products.

The product had a melting point of 65°– 100°C. and gave the following analytical data by weight:

Found: C, 82.52; H, 9.81; N, 3.45; S, 4.84;
Cl, 0.0%

EXAMPLE 14

In a similar experiment to that described in Example 13, to a mixture of 44.2 parts of Rearrangement product A, 5.55 parts of triethylamine, and 100 parts by volume of benzene was added a solution of 2.6 parts of sulphur dichloride in 40 parts by volume of benzene over a period of 1 hour. The reaction mixture was filtered to remove 11.3 parts mainly triethylamine hydrochloride and then the solvent was removed under vacuum to give 45.3 parts of brown-coloured solid, melting point 80°– 110°C., which was shown by thin layer chromatography to be a mixture of compounds.

Elemental analysis of the product gave the following analytical data by weight:

Found: C, 83.69; H, 9.9; N, 3.67; S, 3.69;
Cl, 0.0%

EXAMPLE 15

A solution of 3.5 parts of sulphur dichloride in 10 parts by volume of 1,2-dichloroethane was added dropwise during 10 minutes to a stirred 1,2-dichloroethane (50 parts by volume) solution of 29 parts of rearrangement product A at room temperature. The reaction mass was heated then to reflux and maintained for 16 hours. Afterwards the reaction mass was worked up in the manner described in Example 8 to give 20.3 parts of a yellow coloured solid which was shown by thin layer chromatography to be a mixture of products.

Elemental analysis of the product gave the following analytical data by weight:

Found: C, 82.18; H, 10.07; N, 3.27; S, 3.71;
Cl, 0.47%

The resistance of synthetic lubricants to oxidation may be assessed by a modified Rolls Royce 1001 Oxidation Test. This test consists of passing moist air at 15 litres/hour through 50 ml. of the test fluid (with antioxidant) at a specified temperature for a specified period of time. At the end of the test duration the fluid lost by volatilisation is replaced by adding the required amount of test fluid, and to promote complete homogeneity the mixture is re-heated to the test temperature and nitrogen is passed through for 30 minutes. At the end of this time the viscosity and acidity changes are determined.

EXAMPLES 16 – 30

Synthetic ester-based lubricant compositions were produced and subjected to the Rolls Royce Oxidation Test. The base fluid was a complex ester of sebacic acid, caprylic acid and trimethylolpropane in a nominal molar ratio of 1:28:10 as described and claimed in British Patent Specification No. 971,901.

To each sample of base fluid was added 2% by weight of additive, and the tests were carried out at 215°C. The duration of each test was 3 days and the results are given in following table.

| Ex. | Additive | Viscosity % change | Final acid value mg.KOH/g. | Weight loss % |
|---|---|---|---|---|
|  | 4,4'-di-t-octyl-diphenylamine | 280 | 7.6 | 50 |
|  | Rearrangement Product A | 167 | 7.5 | 39 |
|  | Rearrangement Product B | 121 | 7.6 | 36 |
|  | Rearrangement Product C | 50 | 6.3 | 18 |
|  | Rearrangement Product D | 159 | 7.4 | 42 |
| 16 | Product of Example 1 | 20 | 4 | 6 |
| 17 | Product of Example 2 | 21 | 2.9 | 14 |
| 18 | Product of Example 3 | 20 | 2.3 | 14 |
| 19 | Product of Example 4 | 12 | 2.1 | 12 |
| 20 | Product of Example 5 | 13 | 2.2 | 12 |
| 21 | Product of Example 6 | 32 | 4.4 | 16 |
| 22 | Product of Example 7 | 15 | 1.8 | 11 |
| 23 | Product of Example 8 | 55 | 5.1 | 18 |
| 24 | Product of Example 9 | 14 | 2.4 | 12 |
| 25 | Product of Example 10 | 13 | 2.3 | 9 |
| 26 | Product of Example 11 | 20 | 3.2 | 13 |
| 27 | Product of Example 12 | 26 | 4.1 | 15 |
| 28 | Product of Example 13 | 13 | 2.2 | 13 |
| 29 | Product of Example 14 | 14 | 1.9 | 12 |
| 30 | Product of Example 15 | 12 | 1.6 | 10 |

The results in the table demonstate the effectiveness of the products of the process of the present invention as lubricant antioxidants.

We claim:

1. An antioxidant composition obtained by a process which comprises heating at a temperature of from 80°C to 300°C in a non-oxidising atmosphere, a compound of the formula

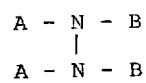

in which A and B represent a phenyl group, a phenyl group substituted with one or more alkyl groups having 1 to 12 carbon atoms or with one or more $\alpha, \alpha$-dimethyl benzyl groups, and then heating the rearrangement product with 0.1 to 4 moles of sulphur or a sulphurising agent per mole of rearrangement product.

2. An antioxidant composition obtained by a process as claimed in claim 1, in which A, B, C and D is a phenyl group bearing at least one tertiary alkyl group containing 4 to 9 carbon atoms.

3. An antioxidant composition obtained by a process as claimed in claim 1, in which each A, B, C and D is a t-octyl-phenyl group.

4. An antioxidant composition obtained by a process as claimed in claim 1, in which the rearrangement product is reacted with sulphur at a temperature of from 100°C. to 300°C.

5. An antioxidant composition obtained by a process as claimed in claim 1, in which the rearrangement product is reacted with a sulphur halide.

* * * * *